United States Patent
Wu et al.

(10) Patent No.: US 11,303,701 B2
(45) Date of Patent: Apr. 12, 2022

(54) HANDLING FAILURE AT LOGICAL ROUTERS

(71) Applicant: NICIRA, INC., Palo Alto, CA (US)

(72) Inventors: Liwen Wu, Santa Cruz, CA (US); Jia Yu, Palo Alto, CA (US); Xinhua Hong, Palo Alto, CA (US); Ronghua Zhang, Palo Alto, CA (US); David Leroy, Palo Alto, CA (US)

(73) Assignee: NICIRA INC., Palo Alto, CA (US)

( * ) Notice: Subject to any disclaimer, the term of this patent is extended or adjusted under 35 U.S.C. 154(b) by 558 days.

(21) Appl. No.: 15/375,142

(22) Filed: Dec. 11, 2016

(65) Prior Publication Data
US 2018/0167272 A1    Jun. 14, 2018

(51) Int. Cl.
| | |
|---|---|
| G06F 15/177 | (2006.01) |
| H04L 67/1001 | (2022.01) |
| H04L 41/0663 | (2022.01) |
| H04L 45/586 | (2022.01) |
| H04L 45/00 | (2022.01) |
| H04L 43/0811 | (2022.01) |
| H04L 45/28 | (2022.01) |

(52) U.S. Cl.
CPC ...... *H04L 67/1002* (2013.01); *H04L 41/0663* (2013.01); *H04L 43/0811* (2013.01); *H04L 45/22* (2013.01); *H04L 45/28* (2013.01); *H04L 45/586* (2013.01)

(58) Field of Classification Search
CPC .. H04L 41/0806; H04L 67/1002; H04L 49/35
See application file for complete search history.

(56) References Cited

U.S. PATENT DOCUMENTS

| | | | |
|---|---|---|---|
| 2002/0167898 A1* | 11/2002 | Thang | H04L 69/40 370/216 |
| 2014/0294005 A1* | 10/2014 | Jain | H04L 45/586 370/392 |
| 2015/0381386 A1* | 12/2015 | Sigoure | H04L 12/4645 370/392 |
| 2016/0226754 A1 | 8/2016 | Zhang et al. | |
| 2016/0226762 A1* | 8/2016 | Zhang | H04L 49/25 |
| 2016/0308690 A1* | 10/2016 | Chanda | H04L 12/4633 |
| 2017/0279705 A1* | 9/2017 | Lin | H04L 45/02 |
| 2017/0310635 A1* | 10/2017 | Yang | H04L 67/1097 |
| 2018/0123951 A1* | 5/2018 | Wang | H04L 45/507 |
| 2018/0219773 A1* | 8/2018 | Li | H04L 45/64 |

* cited by examiner

*Primary Examiner* — Richard G Keehn
(74) *Attorney, Agent, or Firm* — Su IP Consulting

(57) ABSTRACT

Example methods are provided for a first routing component to handle failure at a logical router in a first network. One method may comprise learning first path information associated with a first path provided by an active second routing component, and second path information associated with a second path provided by a standby second routing component. The method may also comprise in response to detecting a first egress packet destined for a second network, sending the first egress packet to the active second routing component based on the first path information. The method may further comprise in response to detecting a failure at the active second routing component and detecting a second egress packet destined for the second network, sending the second egress packet to a new active second routing component based on the second path information.

18 Claims, 12 Drawing Sheets

HANDLING FAILURE AT LOGICAL ROUTERS

BACKGROUND

Unless otherwise indicated herein, the approaches described in this section are not admitted to be prior art by inclusion in this section.

Virtualization allows the abstraction and pooling of hardware resources to support virtual machines in a virtualized computing environment, such as a Software-Defined Data Center (SDDC). For example, through server virtualization, virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc.

Further, through network virtualization, benefits similar to server virtualization may be derived for networking services in the virtualized computing environment. For example, logical networks may be provisioned, changed, stored, deleted and restored programmatically without having to reconfigure the underlying physical hardware. Logical routers may also be configured in a logical network, such as to provide connectivity to an external network. In practice, similar to a physical router, a logical router is susceptible to failure.

DETAILED DESCRIPTION

Figure 1:
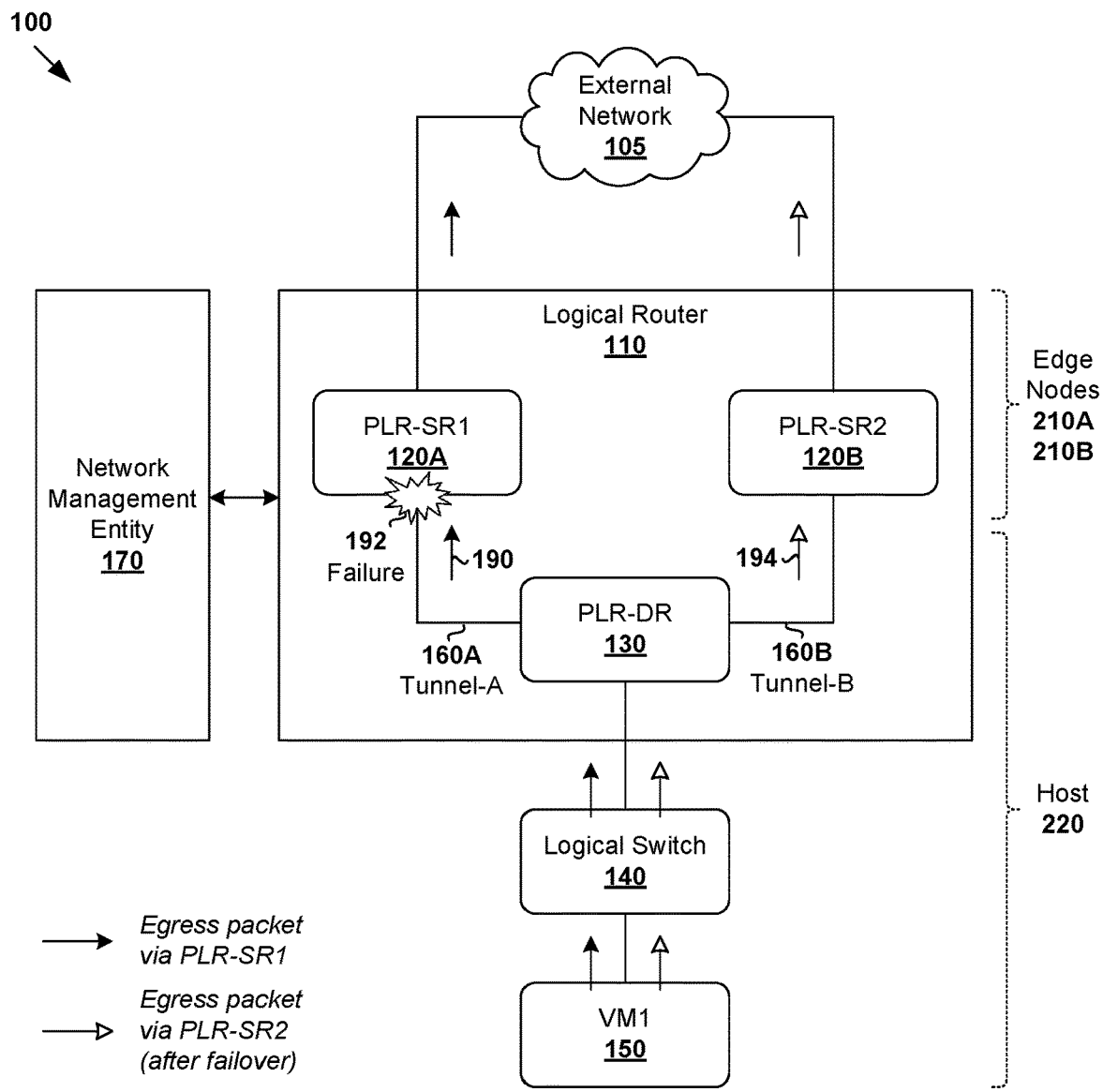
FIG. 1 is a schematic diagram illustrating a management plane view of an example logical router in a logical network.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Figure 2:
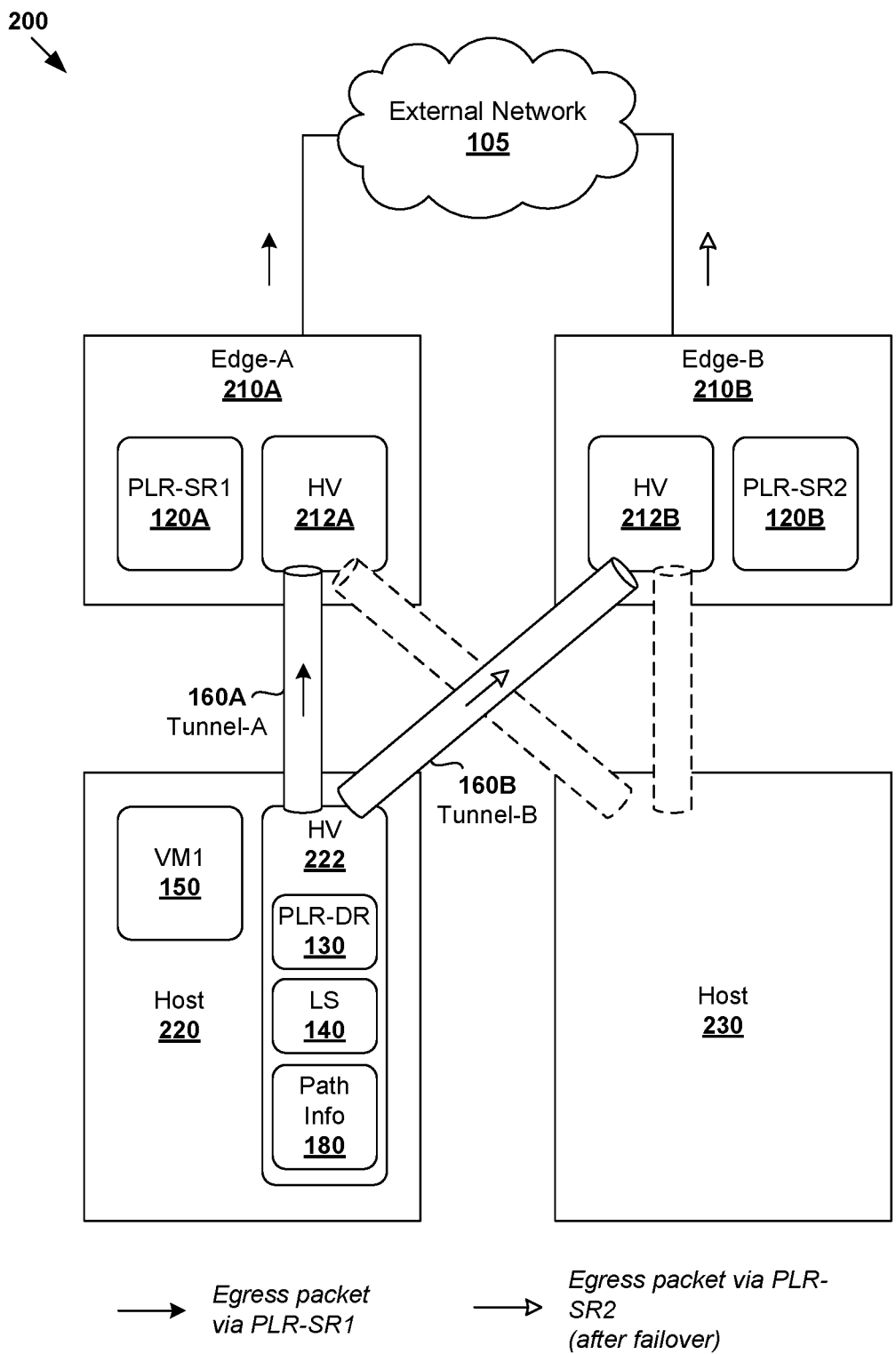
FIG. 2 is a schematic diagram illustrating a physical implementation view of the example logical router in FIG. 1.

Challenges relating to failure handling at logical routers will now be explained in more detail using FIG. 1 and FIG. 2, which represent two different views of the same logical network designed by a user. FIG. 1 is a schematic diagram illustrating a management plane view of example logical router 110 in logical network 100, and FIG. 2 is a schematic diagram illustrating a physical implementation view of example logical router 110 in FIG. 1. It should be understood that, depending on the desired implementation, logical network 100 may include additional and/or alternative component(s) than that shown in FIG. 1 and FIG. 2.

As will be explained further below, the management plane view in FIG. 1 represents how logical router 110 is defined internally, and the physical implementation view in FIG. 2 represents a physical realization of logical router 110. Referring first to FIG. 1, logical router 110 is a provider logical router (PLR) over which a service provider (e.g., data center provider) has full control and interfaces directly with physical external network 105. Logical router 110 is implemented using multiple routing components, which include a distributed router (DR)=PLR-DR 130 and two service routers (SRs)=PLR-SR1 120A and PLR-SR2 120B. Through the present disclosure, a DR will also be referred to as a "first routing component" and an SR as a "second routing component."

PLR-DR 130 of logical router 110 is configured to provide first-hop routing, such as for virtual machine "VM1" 150 that connects to PLR-DR 130 via logical switch 140. PLR-DR 130 may connect to either PLR-SR1 120A or PLR-SR2 120B to access external network 105. PLR-SR1 120A and PLR-SR2 120B also provide centralized stateful services, such as firewall protection, load balancing, network address translation (NAT), etc. For this reason, PLR-SR1 120A and PLR-SR2 120B are also known as centralized routing components, and PLR-DR 130 as a distributed routing component.

PLR-SR1 120A and PLR-SR2 120B provide multiple paths for PLR-DR 130 to access external network 105. For example in FIG. 1, tunnel-A 160A represents a first path and tunnel-B 160B a second path that connect PLR-DR 130 to external network 105 via respective PLR-SR1 120A and PLR-SR2 120B. The term "tunnel" may generally refer to an end-to-end, bi-directional communication path between a pair of virtual tunnel endpoints (VTEPs). In practice, tunnel 160A/160B may be established using any suitable protocol, such as Virtual eXtension Local Area Network (VXLAN), Stateless Transport Tunneling (STT), etc. PLR-DR 130 may be connected to PLR-SR1 120A and PLR-SR2 1208 through one or more logical switches (not shown for simplicity).

Network management entity 170 may represent a network virtualization controller (e.g., software defined network (SDN) controller) on a central control plane in a data center. In practice, the network virtualization controller may be the NSX controller component of VMware NSX®, available from VMware, Inc. The NSX controller controls virtual networks and overlay transport tunnels in the data center under the management of a network virtualization manager (e.g., NSX manager) on a management plane. Network management entity 170 may be implemented using physical machine(s), virtual machine(s), or a combination of both. Configuration of logical router 110 may be performed using network virtualization manager and/or network virtualization controller.

Although examples of the present disclosure refer to virtual machines, it should be understood that a "virtual machine" is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system such as Docker, etc.; or implemented as an operating system level virtualization), virtual private servers, client computers, etc. The virtual machines may also be complete computation environments, containing virtual equivalents of the hardware and software components of a physical computing system.

Referring to physical implementation view 200 in FIG. 2, PLR-DR 130 may be implemented (at least in part) by hypervisor 222 of host 220 to provide first-hop routing for "VM1" 150 supported by host 220 (also known as a "computing device", "host computer", "host device", "physical server", "server system", etc.). In practice, some functionalities (e.g., ingress packet processing) of PLR-DR 130 may be implemented using Edge-A 210A and Edge-B 210B. In the example in FIG. 2, hypervisor 222 also supports logical switch 140 connecting PLR-DR 130 to "VM1" 150 to handle any necessary layer-2 switching.

PLR-SR1 120A and PLR-SR2 120B may be implemented using multiple edge nodes, such as Edge-A 210A and Edge-B 210B. In the example in FIG. 2, PLR-SR1 120A and PLR-SR2 120B are implemented using virtual machines supported by respective first hypervisor 212A at Edge-A 210A and second hypervisor at Edge-B 210B. In practice, SR 120A/120B may be implemented using Linux-based datapath development kit (DPDK) packet processing software, etc. Hypervisor 212A/212B may support a managed forwarding element (MFE), virtual switch, etc., to implement each SR 120A/120B.

Throughout the present disclosure, the term "edge node" may refer generally to a gateway machine that provides layer-3 routing and various layer-4 to layer-7 services in logical network 100. The term "layer-2" may refer generally to a Media Access Control (MAC) layer; "layer-3" to a network or Internet Protocol (IP) layer; "layer-4" to a transport layer; and "layer-7" to an application layer in the Open System Interconnection (OSI) model, although the concepts described herein may be used with other networking models. The term "packet" may refer generally to a group of bits that can be transported together, and may be in another form, such as "frame", "message", "segment", etc. An outgoing packet from "VM1" 150 to external network 105 is known as an egress or northbound packet. An incoming packet (not shown for simplicity) in the reverse direction is known as an ingress or southbound packet.

Edge-A 210A and Edge-B 210B may be members of a cluster of edge nodes that provide services to multiple hosts, including host 220 supporting PLR-DR 130, host 230 supporting other DRs (not shown for simplicity). PLR-SR1 120A and PLR-SR2 120B may operate in an active-active mode or active-standby mode. In the active-active mode, all SRs are active or fully operational at all times and PLR-DR 130 can send egress packets to external network 105 using any one of them. In this case, each edge node has its own Internet Protocol (IP) address and Media Access Control (MAC) address for communicating with external network 105.

In the active-standby mode, only one SR is active or fully operational at one time and PLR-DR 130 can only send egress packets to external network 105 using the active SR. The active-standby mode is generally used when stateful services (explained above) are configured. For example in FIG. 1, PLR-SR1 120A may be assigned as the active SR, and PLR-SR2 120B as a standby SR. Unlike the active-active mode, PLR-SR1 120A and PLR-SR2 120B share a common IP address (but have different MAC addresses for differentiation).

Conventionally, when there is a failure at PLR-SR1 120A, several steps are performed. Firstly, neighboring Edge-B 220B has to be able to detect that PLR-SR1 120A on Edge-A 210A has failed, such as using multiple information channels. For example, a first information channel is formed using a Bidirectional Forwarding Detection (BFD) session between Edge-A 210A and Edge-B 220B in order for the pair to detect the aliveness of each other. Since the first information channel might fail (even when Edge-A 210A is up and running), a second information channel is also formed over a management network to provide redundancy. In this case, Edge-A 210A and Edge-B 220B may detect the aliveness of each other by sending heartbeat messages over the second information channel to each other.

Once PLR-SR2 120B decides that PLR-SR1 120A has failed, PLR-SR2 120B is responsible for initiating a switchover or failover process to take over as the active SR. This involves migrating the IP addresses of all logical port(s) from failed PLR-SR1 120A to PLR-SR2 120B. In particular, PLR-SR2 120B broadcasts a gratuitous address resolution protocol (GARP) message to various recipients (e.g., hosts 220, 230) to announce that the IP address associated with failed PLR-SR1 120A is now associated with PLR-SR2 120B. For example, through the GARP messages, PLR-DR 130 at host 220 is able to learn a mapping between the IP address and the MAC address of PLR-SR2 120B, and associated VTEP information (i.e., after PLR-SR1 120A has failed).

Unfortunately, a fundamental problem with the conventional approach is that GARP is expensive to implement and introduces delays, especially in large-scale networks. For example, for 1000 logical routers (with 1000 SRs) deployed over 5000 hypervisors, the amount of GARP traffic generated is 1000 logical routers×5000 hypervisors×128 bytes×10 times=12.8 GB. The number of GARP packets generated may be 50 million packets, in which case a Central Processing Unit (CPU) at an edge node has to clone and send 50 million GARP packets. At a 10 Gbit network interface controller (NIC) line rate, it might take about five seconds to transmit the packets using one NIC (and one core processor).

The high overhead and high latency caused by the conventional approach makes it unsuitable for many applications, especially those with stringent requirements for network convergence. Here, network convergence refers to the time required for traffic to be rerouted to an alternative (or more optimal) path after a network failure event. For example, real-time video streaming and video conferencing applications require 500 ms of network convergence, and Voice over Internet Protocol (VOIP) applications require 1s. By comparison, a network convergence of 1 minute is acceptable for Transmission Control Protocol (TCP) applications.

Failure Handling

According to examples of the present disclosure, failure handling may be performed more efficiently without necessitating PLR-SR2 120B to broadcast any GARP messages and PLR-DR 130 to wait for those messages. Instead, PLR-DR 130 learns path information associated with multiple paths associated with respective PLR-SR1 120A and PLR-SR2 120B. In the event of a failure of an active SR, PLR-DR 130 is able to select a new active SR, and sends subsequent egress packets to the new active SR based on the path information.

Figure 3:
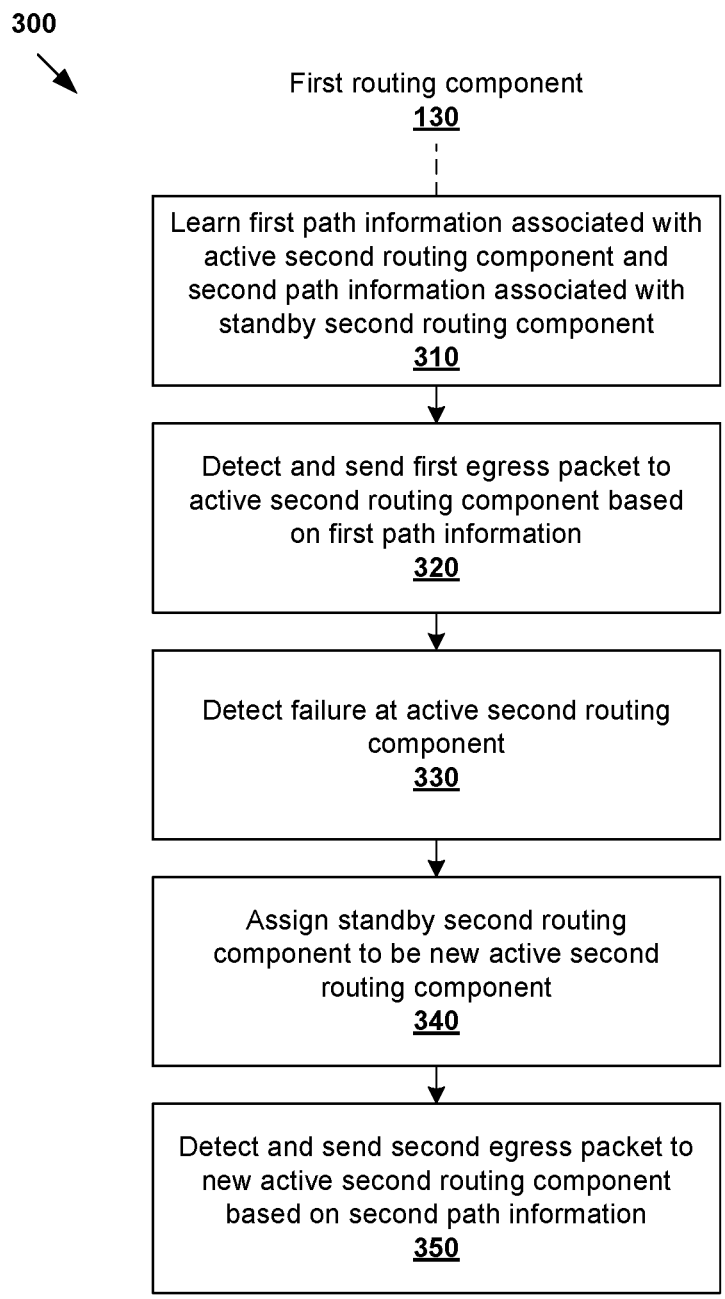
FIG. 3 is a flowchart of an example process for a first routing component to handle failure at a logical router.

In more detail, FIG. 3 is a flowchart of example process 300 for first routing component 130 to handle failure at logical router 110. Example process 300 may include one or more operations, functions, or actions illustrated by one or more blocks, such as 310 to 360. The various blocks may be combined into fewer blocks, divided into additional blocks, and/or eliminated depending on the desired implementation.

In the following, various examples will be explained with reference to FIG. 1 and FIG. 2, particularly using logical network 100 as an example "first network," external network 105 as an example "second network," PLR-DR 130 as an example "first routing component," PLR-SR1 120A and PLR-SR2 120B as example "second routing components," PLR-SR1 120A as an example "active second routing component," and PLR-SR2 120B as an example "standby second routing component" that is selected to be a "new active second routing component." In practice, example process 300 may be implemented by host 220 supporting first routing component 130, such as using hypervisor 222, etc. In practice, it should be understood that multiple "standby second routing components" may be deployed, in which case one of them may be assigned as the "new active second routing component."

At 310 in FIG. 3, PLR-DR 130 learns path information (see 180 in FIG. 1) associated with multiple paths provided by respective PLR-SR1 120A and PLR-SR2 120B that connect PLR-DR 130 to external network 105. For example in FIG. 1, PLR-DR 130 learns first path information (see 186) associated with tunnel-A 160A provided by active SR=PLR-SR1 120A and second path information (see 187) associated with tunnel-B 160B provided by standby SR=PLR-SR2 120B. Path information 186/187 may each include a MAC address (see 181), IP address (see 182), VTEP information (see 183), distance value (see 184) and one or more flags (see 185).

As will be described using FIG. 4, the learning process may involve PLR-DR 130 receiving path information 186/187 from network management entity 170. Also, in some examples, PLR-DR 130 may select PLR-SR1 120A to be an active SR, and PLR-SR2 120B to be a standby SR based on path information 180. In this case, the selection may involve a comparison of distance values (see 184 in FIG. 1) associated with respective PLR-SR1 120A and PLR-SR2 120B.

At 320 in FIG. 3, in response to detecting a first egress packet destined for external network 105, PLR-DR 130 sends the first egress packet (see 190 in FIG. 1) to active SR=PLR-SR1 120A over tunnel-A 160A based on first path information 186 in FIG. 1.

At 330 and 340 in FIG. 3, in response to detecting a failure at active SR=PLR-SR1 120A (see 192 in FIG. 1), PLR-DR 130 assigns PLR-SR2 120B (i.e., standby SR) to be a new active SR to replace failed PLR-SR1 120A.

At 350 in FIG. 3, in response to detecting a second egress packet destined for external network 105, PLR-DR 130 sends the second egress packet (see 194 in FIG. 1) to the new active SR=PLR-SR2 120B based on second path information 187 in FIG. 1.

Using example process 300, the high overhead and high latency caused by any SR generating and sending GARP messages may be reduced, if not avoided, when handing the failure of an active SR. Based on path information 180 learned prior to the failure, the time required for PLR-DR 130 to reroute egress packets from one SR to another SR may be reduced. Examples of the present disclosure therefore provide a control protocol enhancement that facilitates faster end-to-end dataplane network convergence, especially in large-scale networks.

In the following, various examples will be explained using FIG. 4 to FIG. 12B. In particular, an example detailed process for failure handling will be explained using FIG. 4 to FIG. 6A; example failure recovery handling using FIG. 6B to FIG. 8B; and example implementation in a multi-tier logical network using FIG. 9 to FIG. 12B.

Detailed Process

Figure 4:
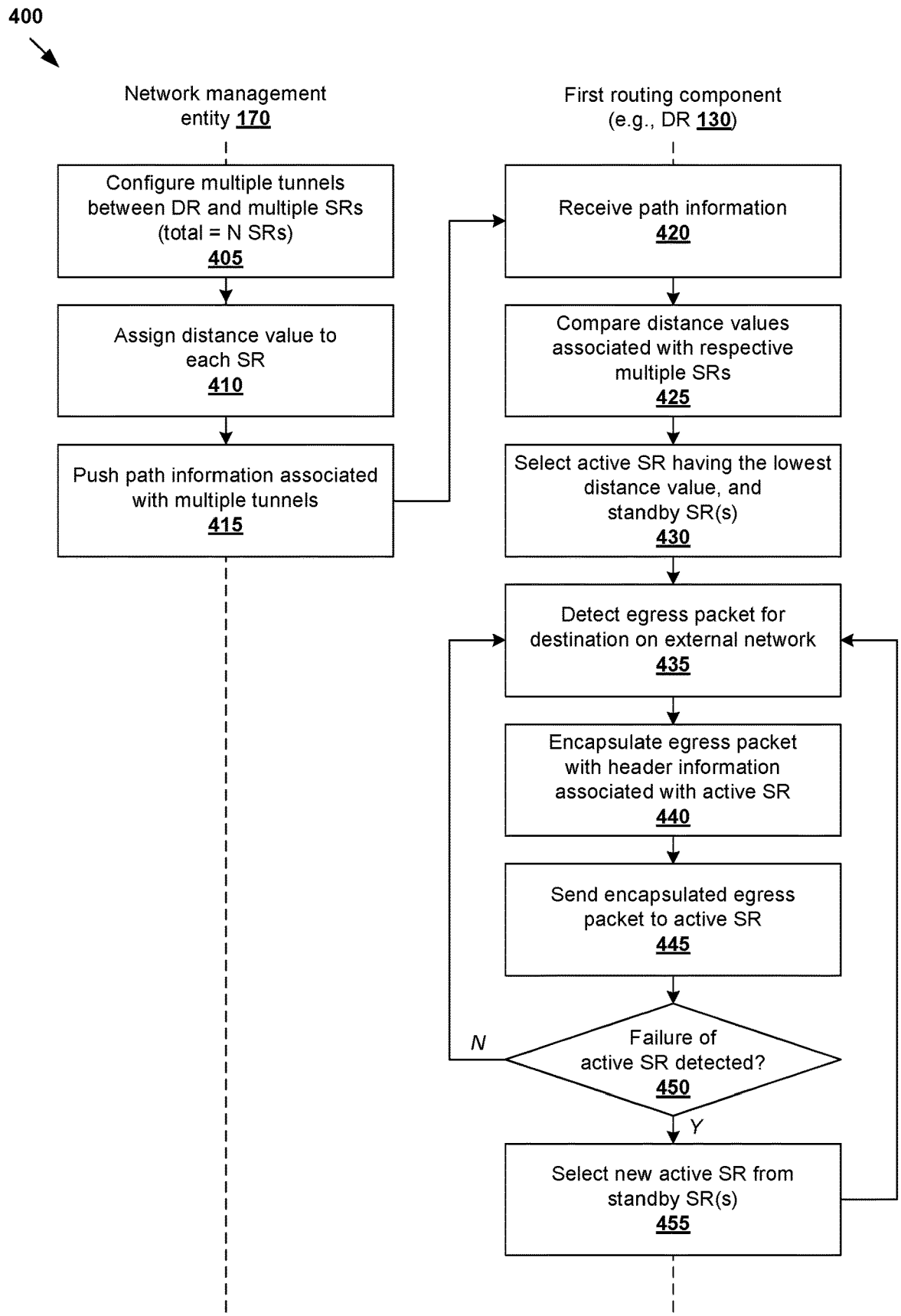
FIG. 4 is a flowchart of an example detailed process for a first routing component to handle failure at a logical router.

FIG. 4 is a flowchart of example detailed process 400 for first routing component 130 to handle failure at logical router 110. Example process 400 may include one or more operations, functions, or actions illustrated by one or more blocks, such as 405 to 455. The various blocks may be combined into fewer blocks, divided into additional blocks, and/or eliminated depending on the desired implementation. In practice, example process 400 may be implemented by network management entity 170 using any suitable module(s), and host 220 supporting PLR-DR 130, etc.

(a) Configuration Phase

At 405 in FIG. 4, network management entity 170 configures multiple tunnels for PLR-DR 130 to reach logical ports of PLR-SR1 120A and PLR-SR2 120B. For example in FIG. 1 (i.e., N=2 SRs), tunnel-A 160A is configured between PLR-DR 130 and PLR-SR1 120A, and tunnel-B 160B between PLR-DR 130 and PLR-SR2 120B.

In practice, a tunnel may be established between a pair of VTEPs. In the example physical implementation in FIG. 2, tunnel-A 160A may be established between hypervisor 212A (i.e., first VTEP) supporting PLR-SR1 120A at Edge-A 210A, and hypervisor 222 (i.e., second VTEP) supporting PLR-DR 130 at host 220. Tunnel-B 160B may be established between hypervisor 212B (i.e., first VTEP) supporting PLR-SR2 120B at Edge-B 210B, and hypervisor 222 (i.e., second VTEP) supporting PLR-DR 130 at host 220.

At 410 in FIG. 4, network management entity 170 assigns a distance value to each tunnel 160A/160B. The distance values are for PLR-DR 130 to compare and rank multiple tunnels. For example in FIG. 1, tunnel-A 160A may be configured as the "best path" and tunnel-B 160B as a "backup path" by assigning distance(PLR-SR1)<distance(PLR-SR2). The range of distance values may be arbitrarily set, such as from 1 (lowest value indicating the most preferred path) to N (highest value indicating the least preferred path).

At 415 in FIG. 4, network management entity 170 sends or pushes path information to PLR-DR 130. In the example in FIG. 1, path information 180 includes <MAC address, IP address, VTEP information, distance, BFD flag(s), PREEMPT flag>. The VTEP information identifies the VTEP such that packets are sent over the appropriate tunnel. The BFD flags may include a DOWN flag indicating whether the tunnel has failed and/or a CPATH (i.e., "concatenated path") flag indicating whether the associated SR has lost physical connectivity with external network 105. As will be explained below using FIG. 7, the PREEMPT flag indicates whether a preemptive or non-preemptive mode is used during failure recovery handling.

Figure 5A:
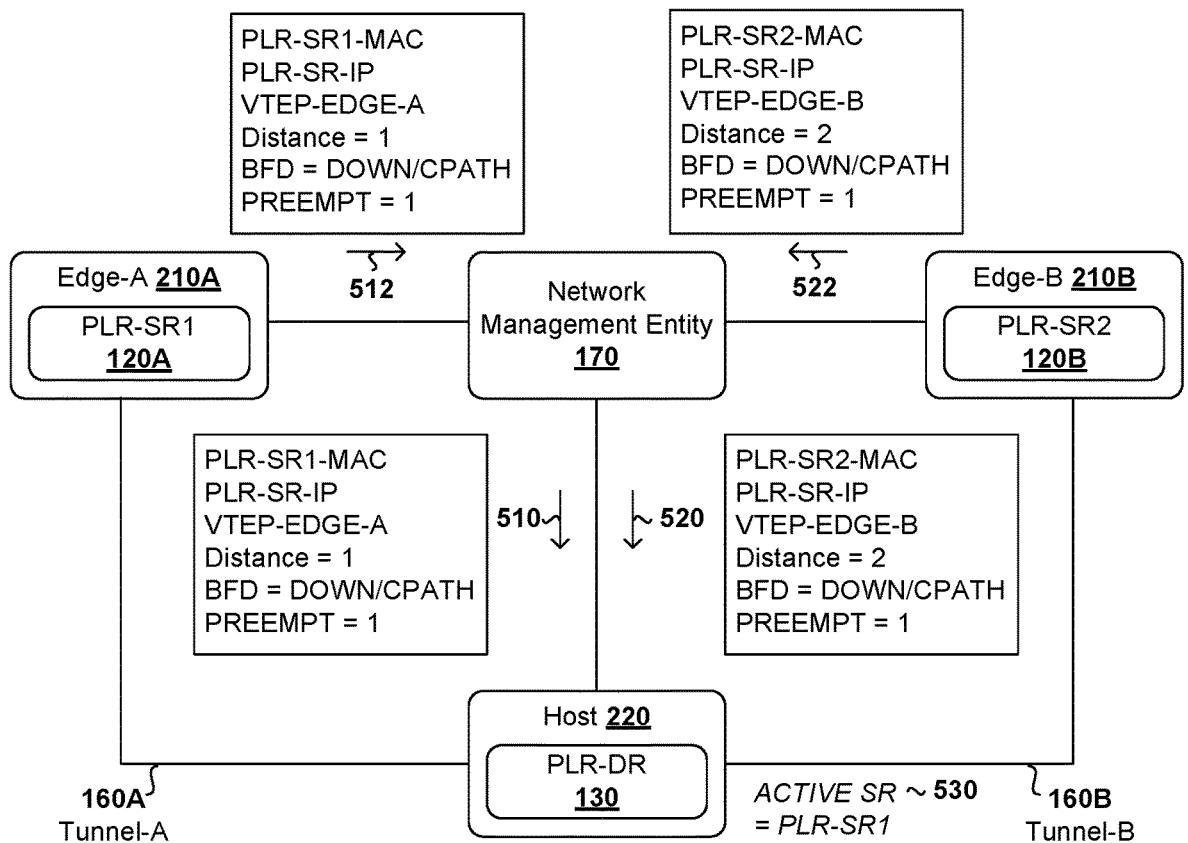
FIG. 5A is a schematic diagram illustrating the first routing component in FIG. 1 learning path information associated with multiple paths.

FIG. 5A is a schematic diagram illustrating first routing component 130 in FIG. 1 learning path information associated with multiple paths. In this example, first path information (see 510 in FIG. 5A) associated with PLR-SR1 120A includes <PLR-SR1-MAC, PLR-SR-IP, VTEP-EDGE-A, distance=1, flag=DOWN/CPATH=0 and PREEMPT flag=1>. Second path information (see 520 in FIG. 5A) associated with PLR-SR2 120B includes <PLR-SR2-MAC, PLR-SR-IP, VTEP-EDGE-B, distance=2, flag=DOWN/CPATH=0 and PREEMPT flag=1>. Again, according to the active-standby mode, PLR-SR1 120A and PLR-SR2 120B both have the same IP address (i.e., PLR-SR-IP), but different MAC addresses.

In practice, path information 510/520 in FIG. 5A may be sent by network management entity 170 in one or more messages. Also, path information 510/512 may be pushed by network management entity 170 after receiving corresponding update messages from Edge-A 210A (see 512 in FIG. 5A) and Edge-B 220B (see 522 in FIG. 5A). The update messages may be sent and received via a management network (not shown for simplicity) that connects network management entity 170, Edge-A 210A and Edge-B 220B.

At 420 and 425 in FIG. 4, after receiving path information 510/520 from network management entity 170, PLR-DR 130 compares distance values assigned to respective PLR-SR1 120A and PLR-SR2 120B. At 430 in FIG. 4, based on the comparison, PLR-DR 130 selects active SR=PLR-SR1 120A (see 530 in FIG. 5A) and standby SR=PLR-SR2 120B based on distance(PLR-SR1)<distance(PLR-SR2). In other words, the active SR has the lowest distance value, while each standby SR has a relatively higher distance value.

(b) Packet Forwarding Phase

At 435 in FIG. 4, PLR-DR 130 receives an egress packet that is destined for a destination on external network 105. In the example in FIG. 1 and FIG. 2, the egress packet may be received from any suitable source within logical network 100, such as from source VM1 150, etc. At 440 and 445 in FIG. 4, in response to receiving the egress packet, PLR-DR 130 encapsulates the egress packet with tunnel header information associated with the active SR and sends the encapsulated packet to the active SR for forwarding to external network 105.

Figure 5B:
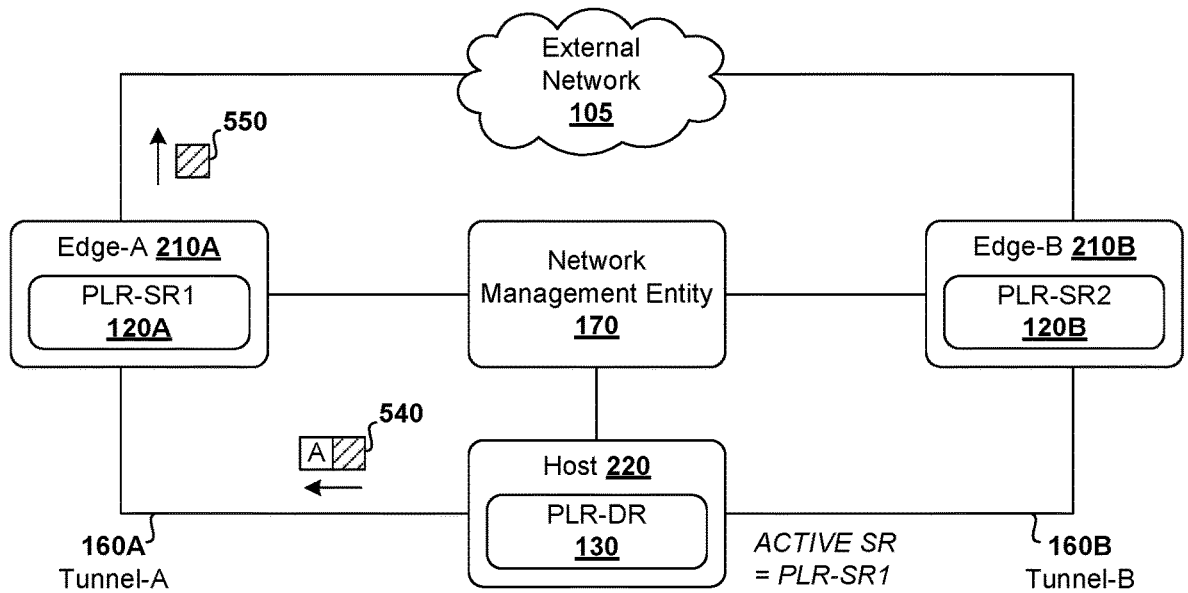
FIG. 5B is a schematic diagram illustrating the first routing component in FIG. 1 performing packet forwarding via an active second routing component prior to a switchover.

FIG. 5B is a schematic diagram illustrating first routing component 130 in FIG. 1 performing packet forwarding via active second routing component 120A prior to a switchover. Since active SR=PLR-SR1 120A, PLR-DR 130 sends encapsulated egress packet (see 540 in FIG. 5B) with tunnel header information labelled "A" associated with PLR-SR1 120A at Edge-A 210A.

For example, based on path information 510 associated with PLR-SR1 120A in FIG. 5A, the tunnel header information may include PLR-SR1-MAC, PLR-SR-IP and VTEP-EDGE-A. Once received at Edge-A 210A via tunnel-A 160A, the encapsulated egress packet (see 540 in FIG. 5B) is decapsulated to remove the tunnel header information and subsequently forwarded by PLR-SR1 120A to external network 105 (see 550 in FIG. 5B).

(c) Switchover Phase

At 450 and 455 in FIG. 4, in response to detecting a failure at the active SR, PLR-DR 130 selects a new active SR from the standby SR(s). In practice, the failure may occur due to various reasons. For example, the active SR may not be operational due to tunnel failure, gateway machine or edge node crashing, virtual machine corruption (e.g., for virtual-machine-based SRs), datapath corruption (e.g., for DPDK-based SRs), power outage, etc. In another example, the active SR might have lost its physical connectivity with a physical router on external network 105, such as due to network failure, NIC failure, etc.

Any suitable approach may be used by PLR-DR 130 to detect the failure. For example, a BFD session may be established between PLR-DR 130 and PLR-SR1 120A over tunnel-A 160A. The detection of DOWN flag=1 indicates that PLR-SR1 120A has failed because tunnel-A 160A is down. The detection of CPATH flag=1 indicates that the failure is due to PLR-SR1 120A losing physical connectivity with external network 105. In practice, one or both of the DOWN and CPATH flags may be used for failure detection. A similar BFD session may be established between PLR-DR 130 and PLR-SR2 120B to monitor tunnel-B 160B where necessary.

Figure 6A:
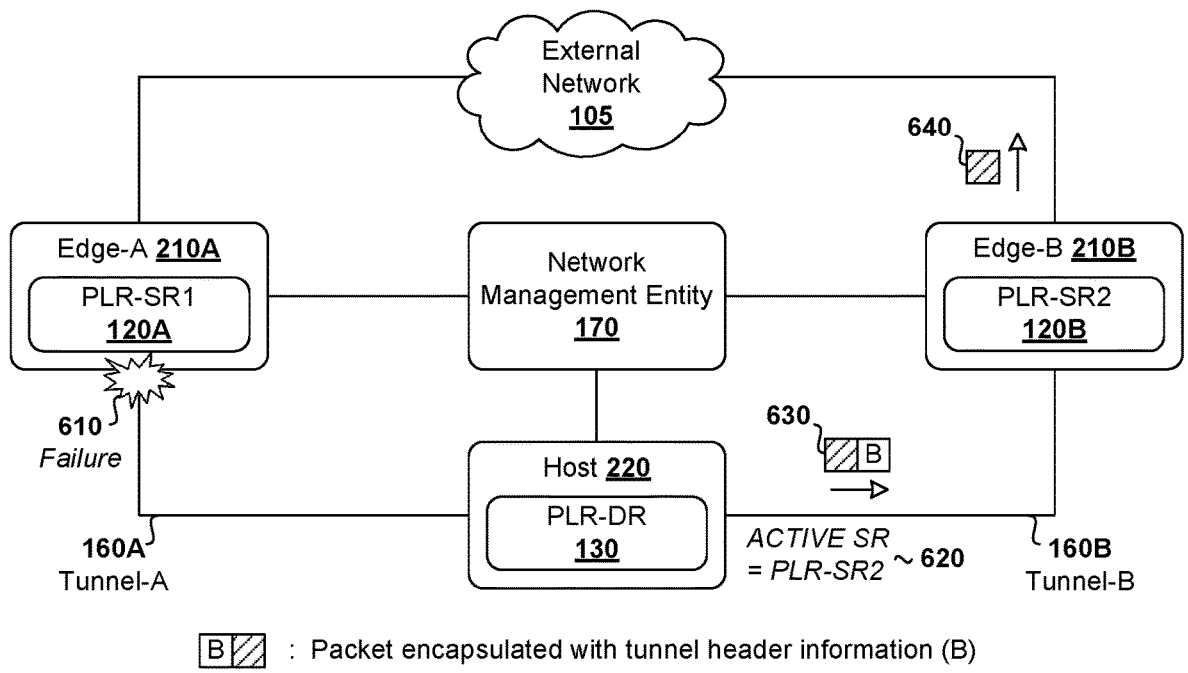
FIG. 6A is a schematic diagram illustrating the first routing component in FIG. 1 performing packet forwarding via a new active second routing component after a switchover.

FIG. 6A is a schematic diagram illustrating first routing component 130 in FIG. 1 performing packet forwarding via new active second routing component 120B after a switchover. In response to detecting the failure of PLR-SR1 120A (see 610 in FIG. 6A), PLR-DR 130 selects new active SR=PLR-SR2 120B (see 620 in FIG. 6A). Although only one standby or backup SR is illustrated for simplicity, it should be understood that multiple standby SRs may be configured. In this case (i.e., N≤3 SRs, one active, at least two standby), the new active SR may be selected from the multiple standby SRs by comparing their distance values.

After switching over to the new active SR, any subsequent egress packet destined for external network 105 may be encapsulated and sent over tunnel-B 160B to the new active SR according to blocks 435, 440 and 445 in FIG. 4. In the example in FIG. 6A, the egress packet is encapsulated with tunnel header information labelled "B" (see 630 in FIG. 6A) that identifies PLR-SR2 120B at Edge-B 210B.

For example, based on path information 520 associated with PLR-SR2 120B in FIG. 5A, the tunnel header information may include PLR-SR2-MAC, PLR-SR-IP and VTEP-EDGE-B associated with PLR-SR2 120B. Once received at Edge-B 210B via tunnel-B 160B, the encapsulated egress packet (see 630 in FIG. 6A) is decapsulated to remove the tunnel header information and forwarded by PLR-SR2 120B to external network 105 (see 640 in FIG. 6A).

Failure Recovery Handling

According to examples of the present disclosure, two modes of failure recovery handling may be supported by PLR-DR 130: preemptive mode and non-preemptive mode. Using the preemptive mode, a failed SR having the lowest distance value will be restored as the active SR once it recovers from a failure. In contrast, using the non-preemptive mode, the failed SR will not be stored as the active SR once it recovers from failure. The preemptive mode will be explained using FIG. 7 and FIG. 6B, and the non-preemptive mode using FIG. 7, FIG. 8A and FIG. 8B.

Figure 7:
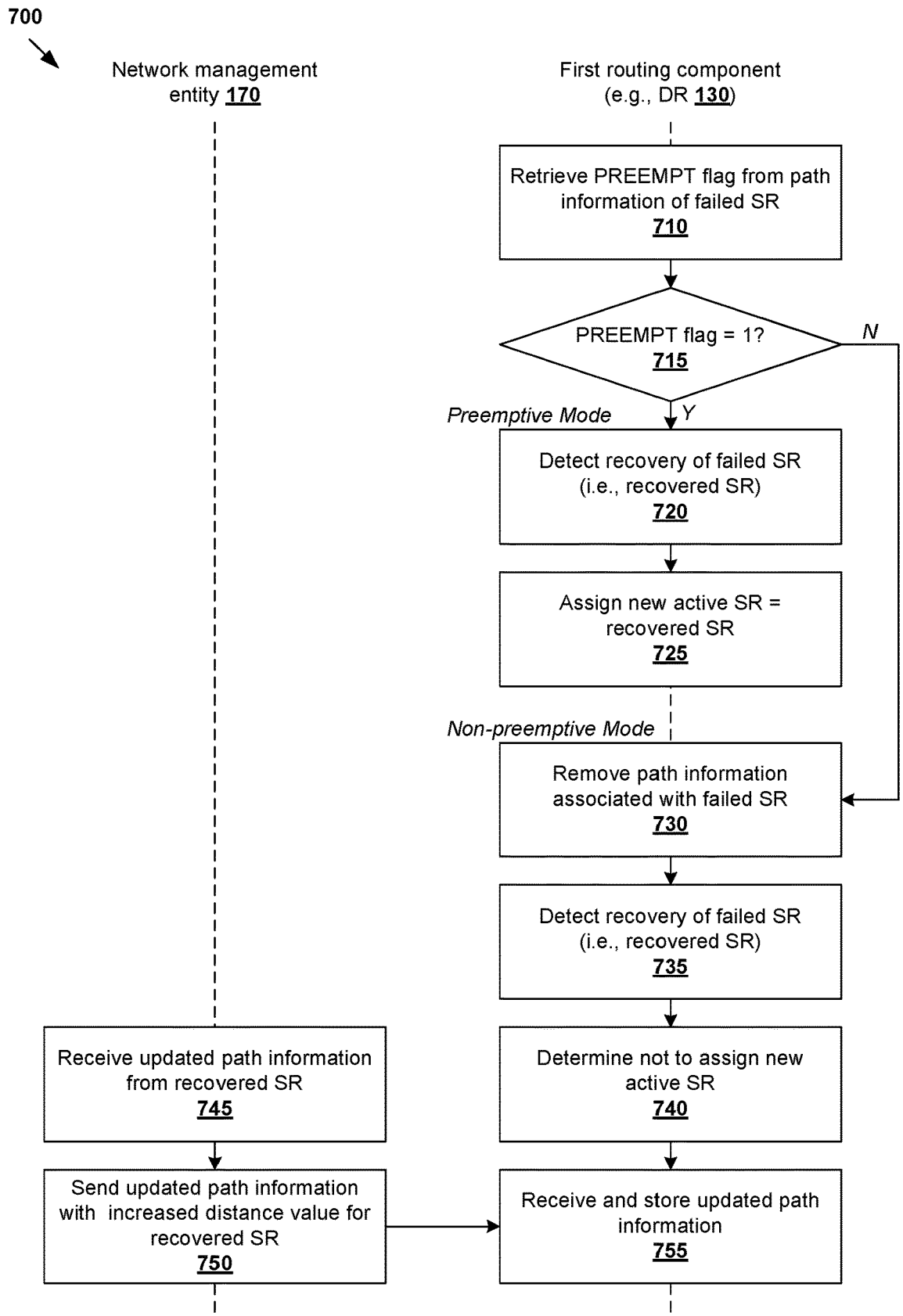
FIG. 7 is a flowchart of an example process for a first routing component to handle recovery of a failed second routing component.

FIG. 7 is a flowchart of example process 700 for first routing component 130 to handle recovery of a failed second routing component 120A. Example process 700 may include one or more operations, functions, or actions illustrated by one or more blocks, such as 710 to 755. The various blocks may be combined into fewer blocks, divided into additional blocks, and/or eliminated depending on the desired implementation. It should be understood that example process 700 is merely conceptual, and blocks 720-725 for the preemptive mode or blocks 730-755 for the non-preemptive mode may be implemented by default without requiring any specific retrieval and determination at blocks 710-715 as to which mode has been configured.

(a) Preemptive Mode

According to 710 and 715 in FIG. 7, PLR-DR 130 retrieves a PREEMPT flag associated with the failed SR to determine that the preemptive mode is configured using PREEMPT flag=1. At 720 and 725 in FIG. 7, once a particular failed SR recovers from a failure, PLR-DR 130 selects the recovered SR (i.e., failed SR that has recovered) as the new active SR to ensure that the best path associated with the lowest distance value is used.

Figure 6B:
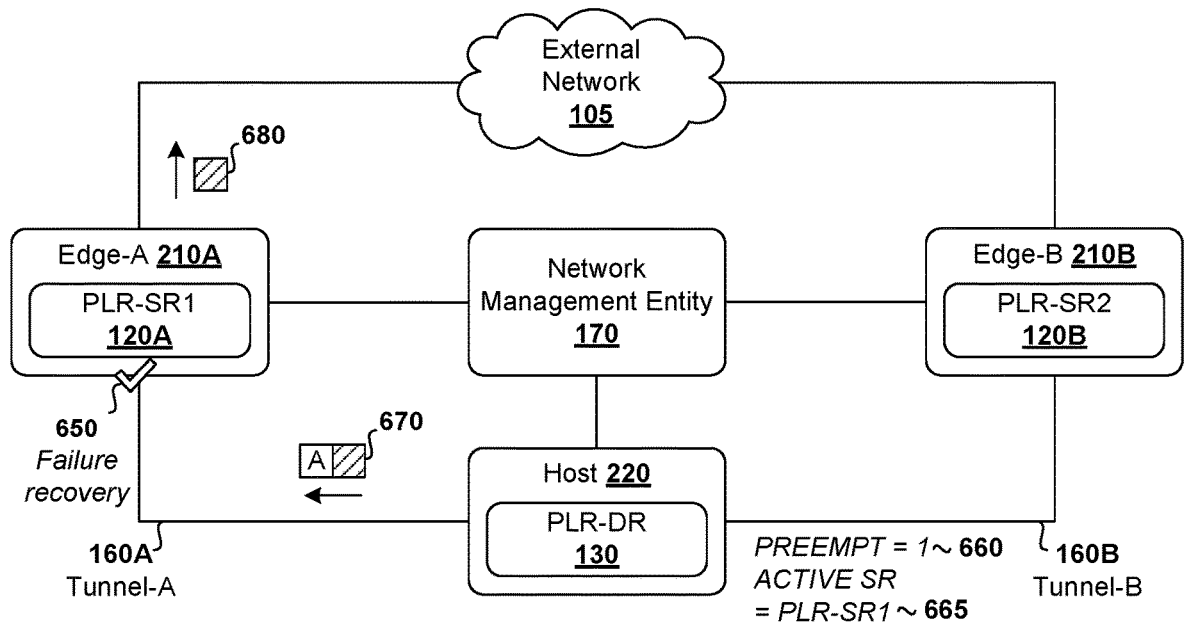
FIG. 6B is a schematic diagram illustrating the first routing component in FIG. 1 performing failure recovery handling according to a preemptive mode.

FIG. 6B is a schematic diagram illustrating first routing component 130 in FIG. 1 performing failure recovery handling according to a preemptive mode. In this example, PLR-DR 130 detects that failed PLR-SR1 120A has recovered from a failure (see 650 in FIG. 6B), such as by detecting that DOWN=0 and/or CPATH=0 from PLR-SR1 120A using the BFD session between PLR-DR 130 and PLR-SR1 120A over tunnel-A 160A. Based on PREEMPT flag=1 (see 660 in FIG. 6B) in the path information associated with PLR-SR1 120A (see 510 in FIG. 5A), PLR-DR 130 replaces PLR-SR2 120B with PLR-SR1 120A (see 665 in FIG. 6B) as the active SR because distance(PLR-SR1)<distance(PLR-SR2).

After switching back to PLR-SR1 120A, PLR-DR 130 encapsulates and sends any subsequent egress packet destined for external network 105 to PLR-SR1 120A according to blocks 435, 440 and 445 in FIG. 4. In the example in FIG. 6B, the egress packet is once again encapsulated with tunnel header information labelled "A" (see 670 in FIG. 6B). Once received by Edge-A 210A over tunnel-A 160A, it is decapsulated (see 680 in FIG. 6B) and forwarded by PLR-SR1 120A to external network 105.

(b) Non-Preemptive Mode

The preemptive mode in FIG. 6B ensures that the SR having the lowest distance value is reassigned as the active SR after it recovers from a failure. In practice, however, the reassignment may not be necessary, such as when multiple paths associated with respective SRs have equal cost (e.g., in terms of number of hops). In this case, path information 510/520 in FIG. 5A sets PREEMPT flag=0 to configure the non-preemptive mode.

Referring to 710, 715 and 730 FIG. 7, PLR-DR 130 removes the path information associated with the failed SR when operating in the non-preemptive mode. At 735 and 740 in FIG. 7, once the failed SR has recovered, PLR-DR 130 determines not to reinstate the recovered SR (i.e., failed SR that has recovered) as the active SR. In fact, to avoid taking over a current active SR, the recovered SR also reports updated path information with increased distance value to network management entity 170. At 745 and 750 in FIG. 7, network management entity 170 receives the updated path information from the recovered SR and relays it to PLR-DR 130. At 755 in FIG. 7, PLR-DR 130 receives and stores the updated path information of the recovered SR.

Figure 8A:
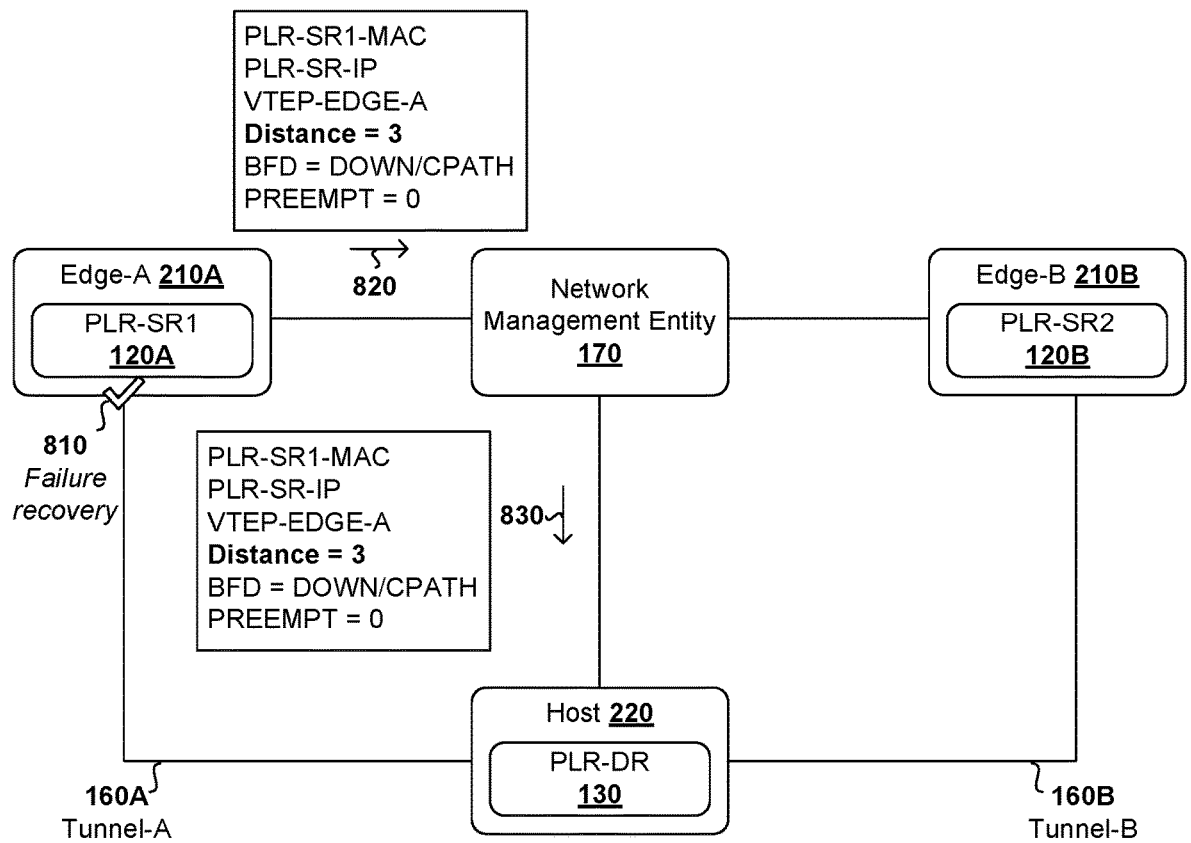
FIG. 8A is a first schematic diagram illustrating the first routing component in FIG. 1 performing failure recovery handling according to a non-preemptive mode.

FIG. 8A is a first schematic diagram illustrating first routing component 130 in FIG. 1 performing failure recovery handling according to a non-preemptive mode. Similar to the example in FIG. 6B, PLR-DR 130 may detect that failed PLR-SR1 120A has recovered (see 810 in FIG. 8A), such as by detecting that DOWN=0 and/or CPATH=0 using the BFD session. Once PLR-SR1 120A has recovered, updated path information (see 820 in FIG. 8A) is sent to network management entity 170, which then relays it to PLR-DR 130 (see 830 in FIG. 8A). Specifically, updated path information=<PLR-SR1-MAC, PLR-SR-IP, VTEP-EDGE-A, distance=3, flag=DOWN/CPATH=0 and PREEMPT flag=0>. Compared to the old path information (see 510 in FIG. 5A), distance(PLR-SR1) is increased from 1 to 3. As such, distance(PLR-SR1)>distance(PLR-SR2).

Figure 8B:
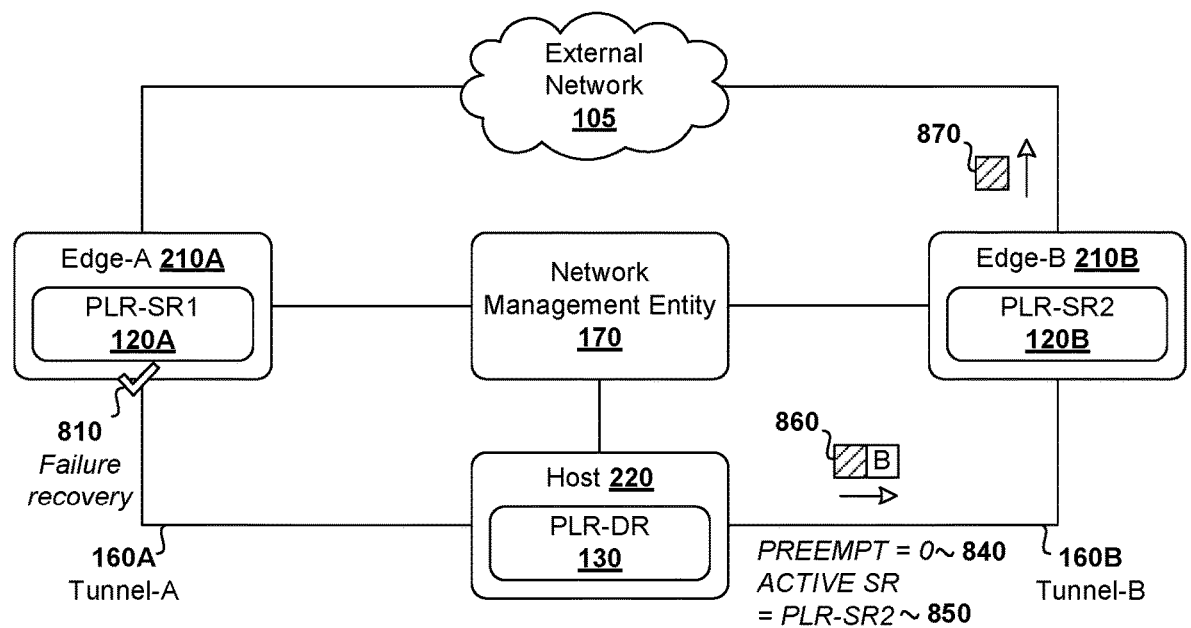
FIG. 8B is a second schematic diagram illustrating the first routing component in FIG. 1 performing failure recovery handling according to a non-preemptive mode.
Figure 8B:

FIG. 8B is a second schematic diagram illustrating first routing component 130 in FIG. 1 performing failure recovery handling according to a non-preemptive mode. In this example, based on PREEMPT flag=0 (see 840 in FIG. 8B) in the path information associated with PLR-SR1 120A, PLR-DR 130 determines that it is not necessary to reinstate the recovered SR as the active SR. As such, active SR=PLR-SR2 120B remains unchanged (see 850 in FIG. 8B).

In contrast to the preemptive mode in FIG. 6B, PLR-DR 130 continues to use PLR-SR2 120B to send egress packets destined for external network 105 according to blocks 435, 440 and 445 in FIG. 4. Each egress packet is encapsulated with tunnel header information labelled "B" (see 860 in FIG. 8B). Similarly, the encapsulated egress packet is sent over tunnel-B 160B to reach Edge-B 210B, after which it is decapsulated (see 870 in FIG. 8B) and forwarded by PLR-SR2 120B to external network 105.

Multi-Tier Topology

The above examples have been explained using logical router 110 having a single tier. In data centers with multiple tenants, a multi-tier topology may be used. For example, a two-tier logical router topology includes a top tier of a provider logical router (PLR) and a lower tier of tenant logical router (TLR). The two-tiered structure enables both the provider (e.g., data center owner) and tenant (e.g., data center tenant; often there are multiple tenants) to control their own services and policies at respective tiers. Each tenant has full control over its TLR, which provides indirect access to external network 105 through a PLR.

For multi-tier logical routers, each tier may include both DRs and SRs, or DRs and SRs at the upper tier but only DRs at the lower tier. Some data centers may have only one PLR to which all TLRs attach, whereas other data centers may have numerous PLRs. For example, a large data center may want to use PLR policies for different tenants, or have too many different tenants to attach all of the TLRs to a single PLR.

For simplicity, an example having one PLR, two TLRs and both DR and SRs at each tier will be explained using FIG. 9, which is a schematic diagram illustrating management plane view of an example multi-tier logical router in logical network 900. It should be understood that, depending on the desired implementation, logical network 900 may include additional and/or alternative components than that shown in FIG. 9.

In a first tier of the logical router, PLR 110 (also shown in FIG. 1) includes PLR-SR1 120A and PLR-SR2 120B that provide multiple paths for PLR-DR 130 to connect to external network 105. In a second tier, TLR1 910 and TLR2 912 (i.e., multiple TLRs) are connected to PLR 110 via respective logical switches LS1 901 and LS2 902.

TLR1 910 (e.g., controlled by a first tenant) includes one DR (see TLR1-DR 930) and two SRs (see TLR1-SR1 920C and TLR1-SR2 920D). TLR1 910 provides (indirect) access to external network 105 for source VM2 905, which is connected to TLR1-DR 930 via a logical switch (see LS3 903). In the case of active SR=TLR1-SR1 920C and standby SR=TLR1-SR2 920D, a switchover may be performed when a failure (see 940) is detected at TLR1-SR1 920C.

TLR2 912 (e.g., controlled by a second tenant) includes one DR (see TLR2-DR 932) and two SRs (see TLR2-SR1 922C and TLR2-SR2 922D). Similarly, TLR2 912 provides (indirect) access to external network 105 for source VM3 906, which is connected to TLR2-DR 932 via a logical switch (see LS4 904). In the case of active SR=TLR2-SR1 922C and standby SR=TLR2-SR2 922D, a switchover may be performed when a failure (see 942) is detected at TLR2-SR1 922C.

In the following, example failure handling at the multi-tier logical router in FIG. 9, and particularly at the TLR tier, will be explained using the example processes in FIG. 3, FIG. 4 and FIG. 7.

Failure Handling in Multi-Tier Logical Network (a) Configuration Phase

Figure 9:
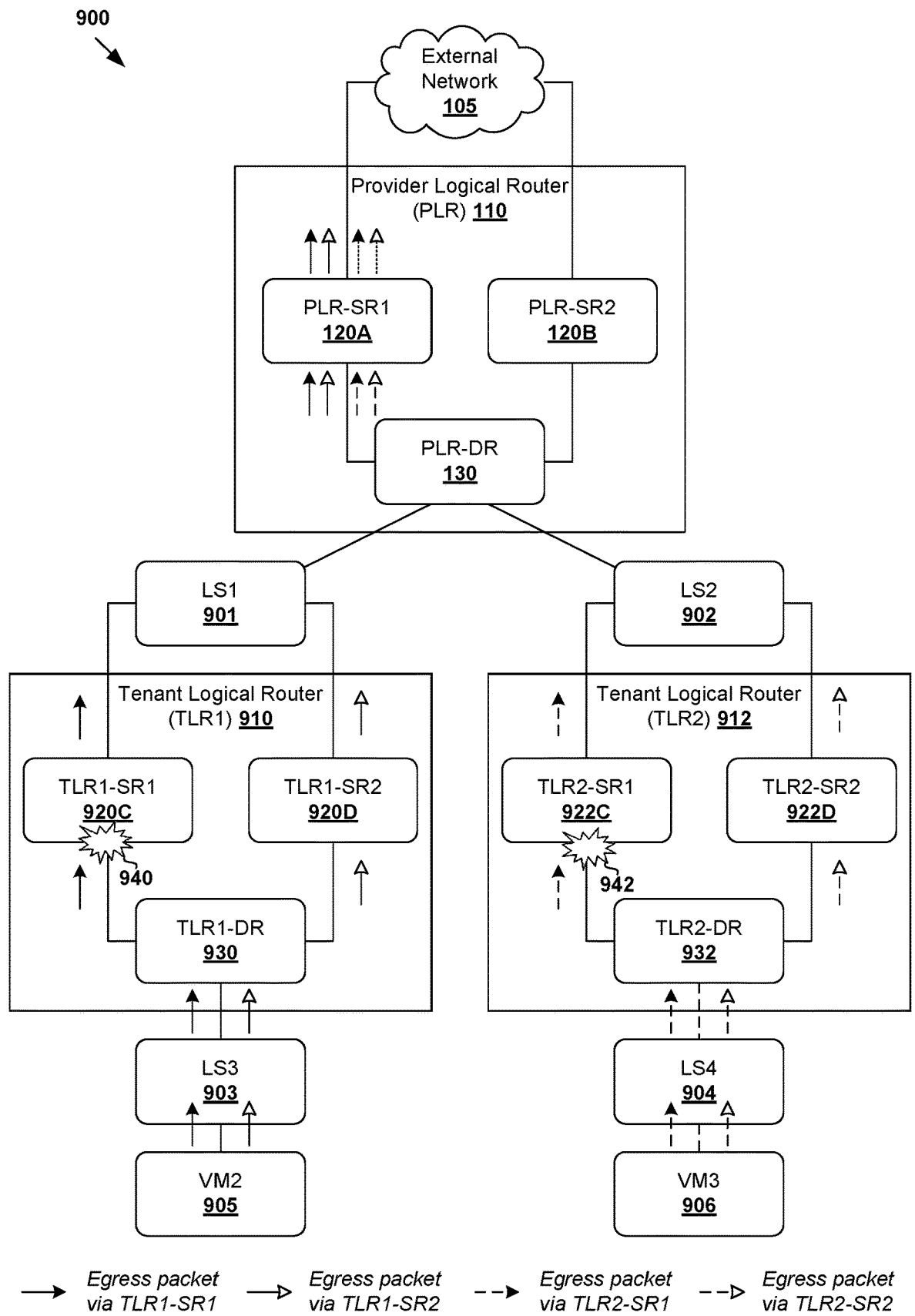
FIG. 9 is a schematic diagram illustrating a management plane view of an example multi-tier logical router in a logical network.
Figure 10A:
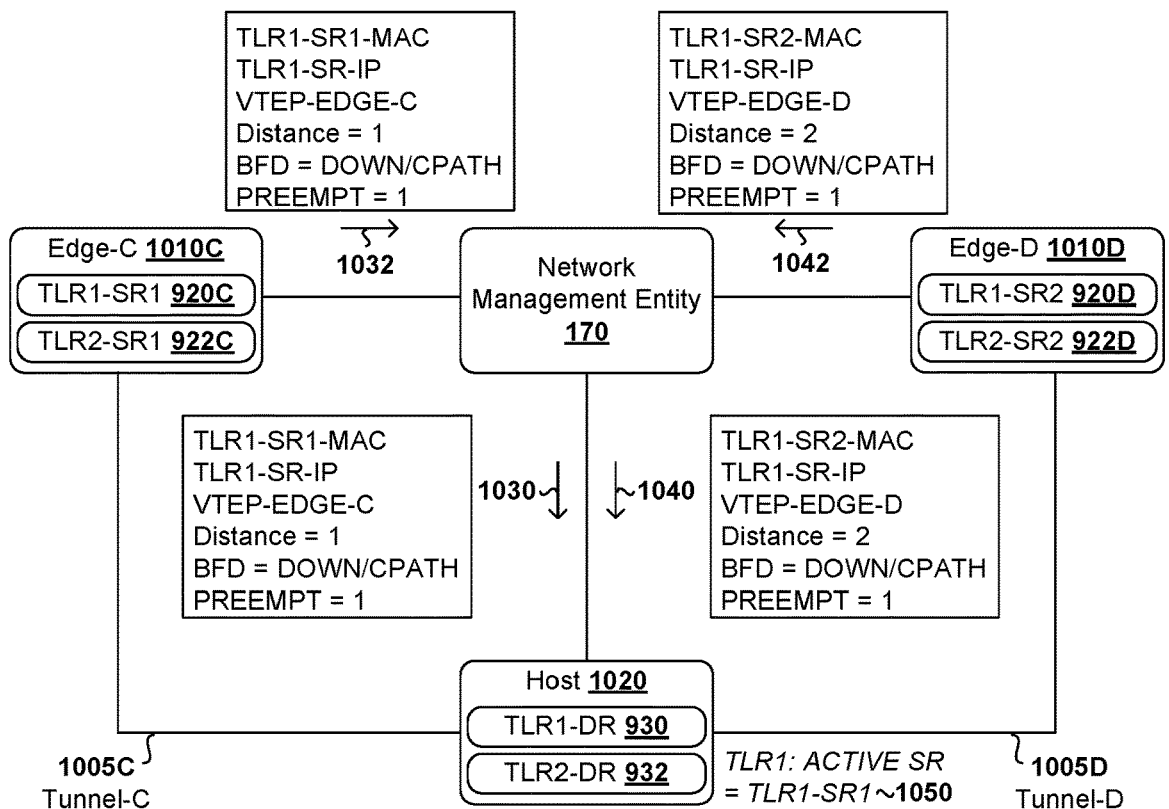
FIG. 10A is a first schematic diagram illustrating a first routing component learning path information associated with multiple paths in the example in FIG. 9.

FIG. 10A is a first schematic diagram illustrating first routing component 930 learning path information associated with multiple paths in the example in FIG. 9. In this example, Edge-C 1010C supports TLR1-SR1 920C and TLR2-SR1 922C, while Edge-D 1010D supports TLR2-SR2 920D and TLR2-SR2 922D. Host 1020 supports both TLR1-DR 930 and TLR2-DR 932, such as using a hypervisor, etc.

Similar to the single-tier case, network management entity 170 configures multiple tunnels, assigns distance values and pushes path information to TLR1-DR 930 and TLR2-DR 932. For example, tunnel-C 1005C is configured between host 1020 and Edge-C 1010C, and tunnel-D 1005D between host 1020 and Edge-D 1010D.

In relation to TL1 910 in FIG. 9, TLR1-DR 930 learns the following path information to select active SR=TLR1-SR1 920C (see 1050 in FIG. 10A), and standby SR=TLR1-SR2 920D because distance(TLR1-SR1)<distance(TLR1-SR2).

(1) First path information (see 1030 in FIG. 10A)=<TLR1-SR1-MAC, TLR1-SR-IP, VTEP-EDGE-C, distance=1, flag=DOWN/CPATH=0 and PREEMPT flag=1> based on a corresponding message from Edge-C 1010C (see 1032 in FIG. 10A).

(2) Second path information (see 1040 in FIG. 10A)=<TLR1-SR2-MAC, TLR1-SR-IP, VTEP-EDGE-D, distance=2, flag=DOWN/CPATH=0 and PREEMPT flag=1>. The second path information is pushed to TLR1-DR 930 based a corresponding message from Edge-D 1010D (see 1042 in FIG. 10A).

Figure 10B:
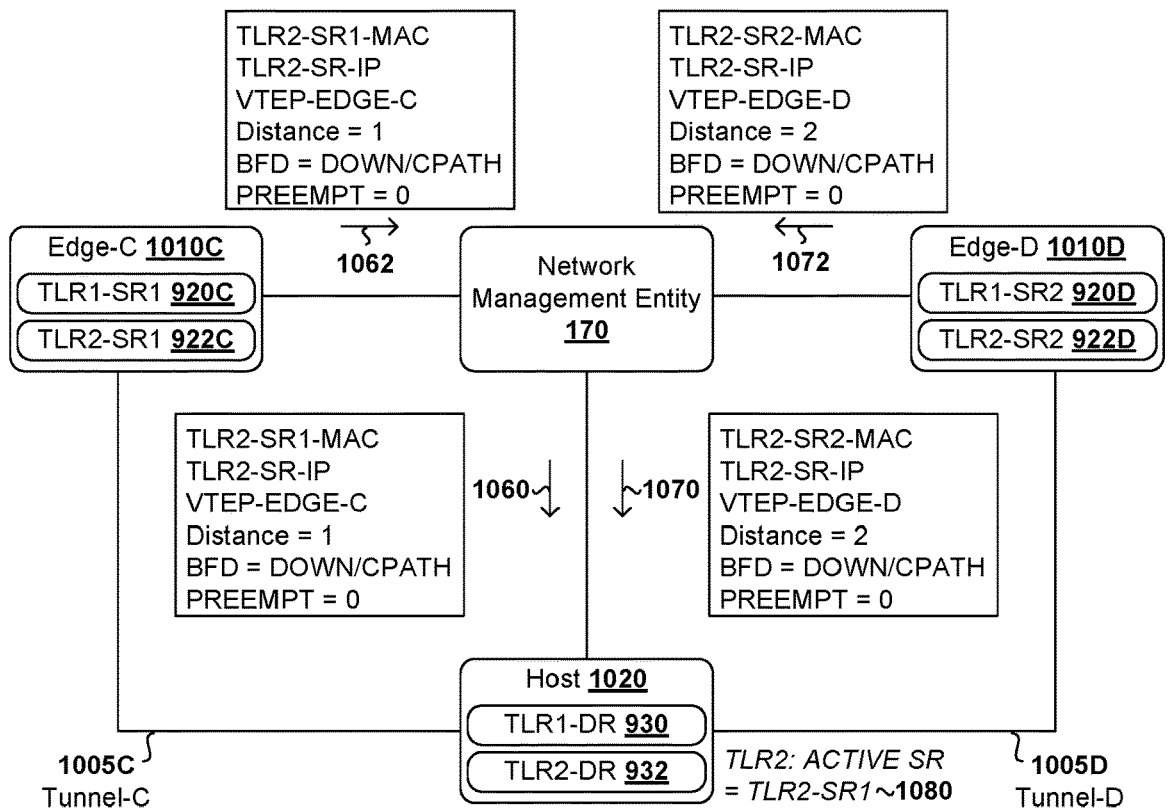
FIG. 10B is a second schematic diagram illustrating a first routing component learning path information associated with multiple paths in the example in FIG. 9.

FIG. 10B is a second schematic diagram illustrating first routing component 932 learning path information associated with multiple paths in the example in FIG. 9. In relation to TL2 912 in FIG. 9, TLR2-DR 932 learns the following path information (note that PREEMPT flag=0) to select active SR=TLR2-SR1 922C (see 1080 in FIG. 10B), and standby SR=TLR2-SR2 922D because distance(TLR2-SR1)<distance(TLR2-SR2).

(1) First path information (see 1060 in FIG. 10B)=<TLR2-SR1-MAC, TLR2-SR-IP, VTEP-EDGE-C, distance=1, flag=DOWN/CPATH=0 and PREEMPT flag=0> based on a corresponding message from Edge-C 1010C (see 1062 in FIG. 10B).

(2) Second path information (see 1070 in FIG. 10B)=<TLR2-SR2-MAC, TLR2-SR-IP, VTEP-EDGE-D, distance=2, flag=DOWN/CPATH=0 and PREEMPT flag=1>. The second path information is pushed to TLR2-DR 932 based a corresponding message from Edge-D 1010D (see 1072 in FIG. 10B).

(b) Packet Forwarding Phase

Figure 11A:
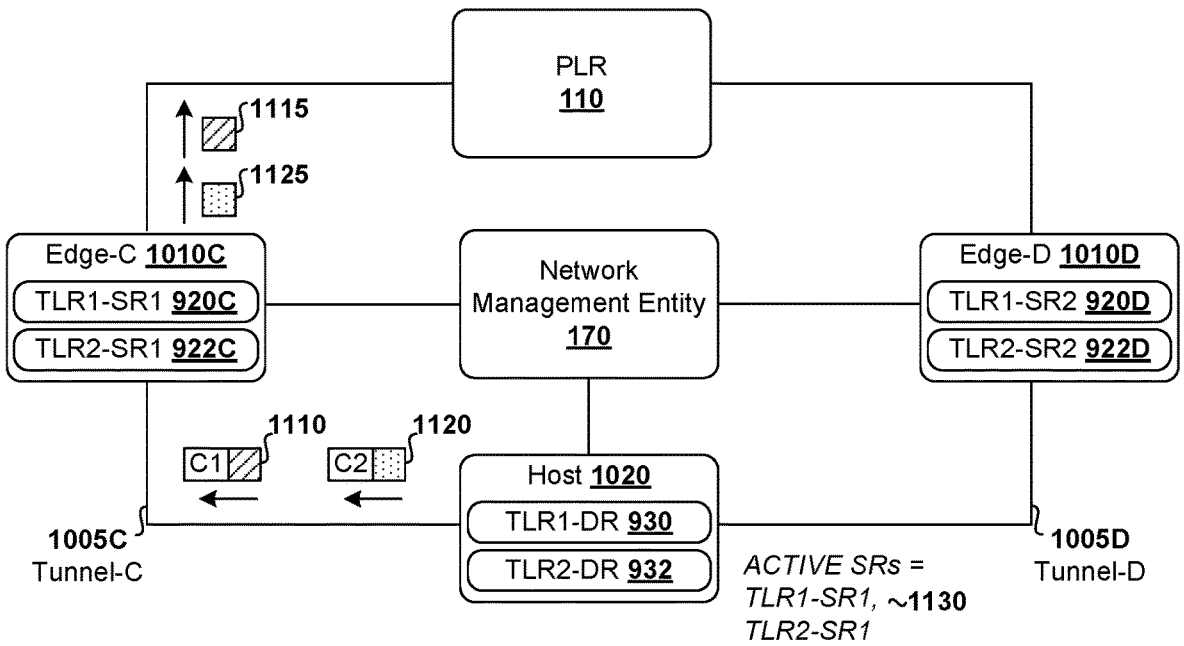
FIG. 11A is a schematic diagram illustrating a first routing component performing packet forwarding via an active second routing component prior to a switchover in the example in FIG. 9.

FIG. 11A is a schematic diagram illustrating first routing component 930/932 performing packet forwarding via active second routing component 920C/922C prior to a switchover in the example in FIG. 9.

In relation to TLR1 910, since active SR=TLR1-SR1 920C, TLR1-DR 930 sends encapsulated egress packet (see 1110 in FIG. 11A) with tunnel header information labelled "C1," which may include TLR1-SR1-MAC, TLR1-SR-IP and VTEP-EDGE-C associated with TLR1-SR1 920C at Edge-C 1010C. Once received at Edge-C 1010C via tunnel-C 1005C, the encapsulated egress packet is decapsulated and sent by TLR1-SR1 920C (see 1115 in FIG. 11A) to external network 105 via PLR 110.

In relation to TLR2 920, since active SR=TLR2-SR1 922C, TLR2-DR 932 sends encapsulated egress packet (see 1120 in FIG. 11A) with tunnel header information labelled "C2," which may include TLR2-SR1-MAC, TLR2-SR-IP and VTEP-EDGE-C associated with TLR2-SR1 922C at Edge-C 1010C. Once received at Edge-C 1010C via tunnel-C 1005C, the encapsulated egress packet is decapsulated and sent by TLR2-SR1 922C (see 1125 in FIG. 11A) to external network 105 via PLR 110.

(c) Switchover Phase

Figure 11B:
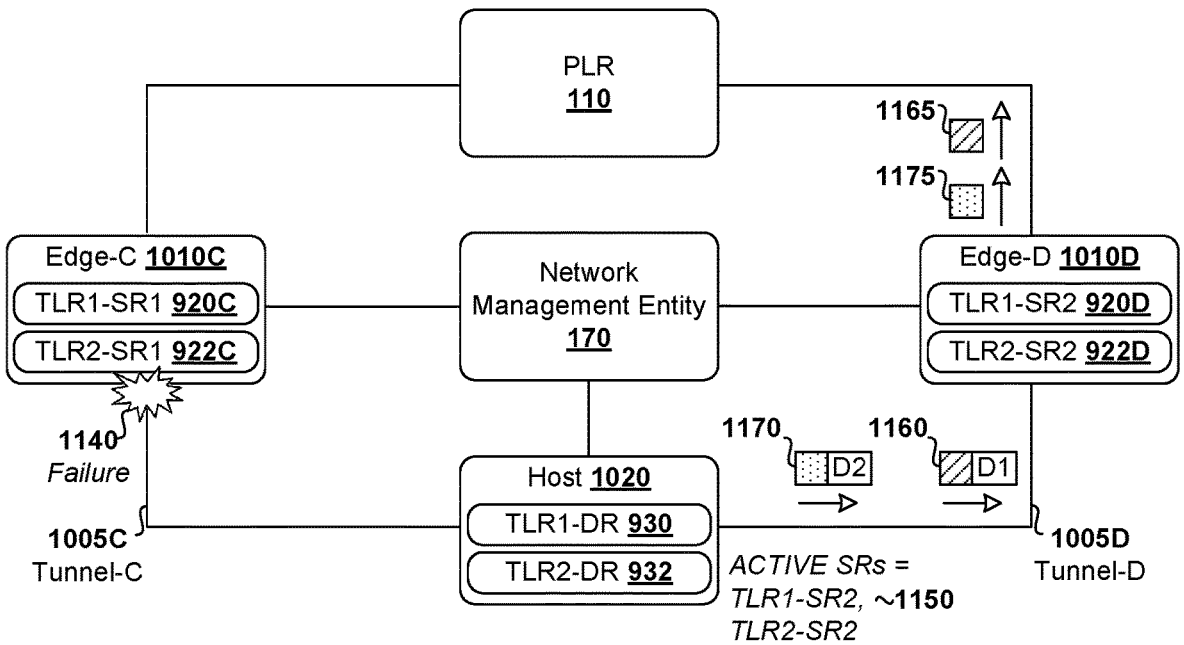
FIG. 11B is a schematic diagram illustrating a first routing component performing packet forwarding via a new active second routing component after a switchover in the example in FIG. 9.

FIG. 11B is a schematic diagram illustrating first routing component 930/932 performing packet forwarding via new active second routing component 920D/922D after a switchover in the example in FIG. 9.

In relation to TLR1 910, in response to detecting a failure at active SR=TLR1-SR2 920D (see 1140 in FIG. 11B), TLR1-DR 930 selects new active SR=TLR1-SR2 920D. After the switchover, TLR1-DR 930 encapsulates and sends egress packet (see 1160 in FIG. 11B) destined for external network 105 to TLR1-SR2 920D. Tunnel header information labelled "D1" may include TLR1-SR2-MAC, TLR1-SR-IP and VTEP-EDGE-D associated with TLR1-SR2 920D. Once received at Edge-D 1010D via tunnel-D 1005D, the encapsulated egress packet is decapsulated and sent (see 1165 in FIG. 11B) to external network 105 via PLR 110.

In relation to TLR2 910, in response to detecting a failure at active SR=TLR2-SR2 922D (see 1140 in FIG. 11B), TLR2-DR 932 selects new active SR=TLR2-SR2 922D. After the switchover, TLR2-DR 932 encapsulates and sends egress packet (see 1170 in FIG. 11B) destined for external network 105 to TLR2-SR2 922D. Tunnel header information labelled "D2" may include TLR2-SR2-MAC, TLR2-SR-IP and VTEP-EDGE-D associated with TLR2-SR2 922D. The encapsulated egress packet is then decapsulated and sent (see 1175 in FIG. 11B) to external network 105 via PLR 110.

Similar to the single-tier case, failure recovery handling according to the example in FIG. 6 may be performed once a failed SR recovers. The preemptive mode will be explained using FIG. 12A, and the non-preemptive mode in FIG. 12B.

(d) Preemptive Mode

Figure 12A:
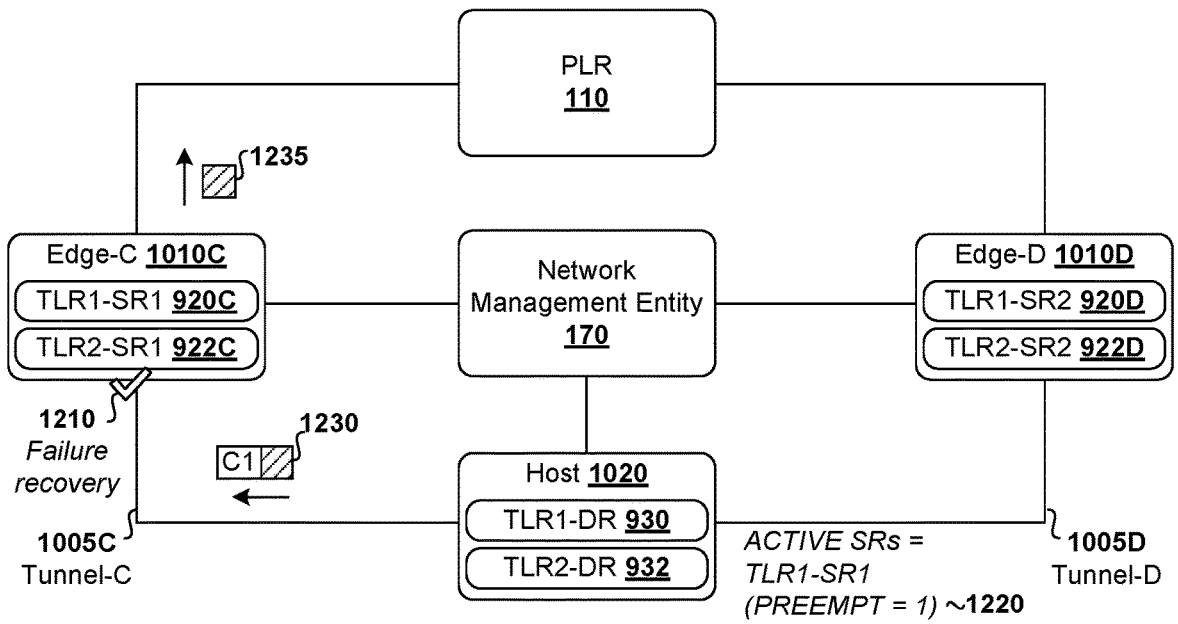
FIG. 12A is a schematic diagram illustrating a first routing component performing failure recovery handling according to a preemptive mode in the example in FIG. 9.

FIG. 12A is a schematic diagram illustrating first routing component 930 performing failure recovery handling according to a preemptive mode in the example in FIG. 9. In this case, TLR1-DR 930 may detect the recovery of failed TLR1-SR1 920C (see 1210 in FIG. 12A) by, for example, detecting DOWN=0 using a BFD session over tunnel-C 1005C. (CPATH is usually not applicable here because TLR1-SR1 920C is not directly connected to external network 105).

Based on PREEMPT flag=1 in the path information in FIG. 10A, TLR1-DR 930 switches back to TLR1-SR1 920C (see 1220 in FIG. 12A) as the active SR because distance(TLR1-SR1)<distance(TLR1-SR2). After the recovery, TLR1-DR 930 encapsulates and sends egress packet (see 1230 in FIG. 12A) destined for external network 105 to TLR1-SR1 920C. Once received at Edge-C 1010C via tunnel-C 1005C, the encapsulated egress packet is decapsulated and sent by TLR1-SR2 920D (see 1235 in FIG. 12A) to external network 105 via PLR 110.

(e) Non-Preemptive Mode

Figure 12B:
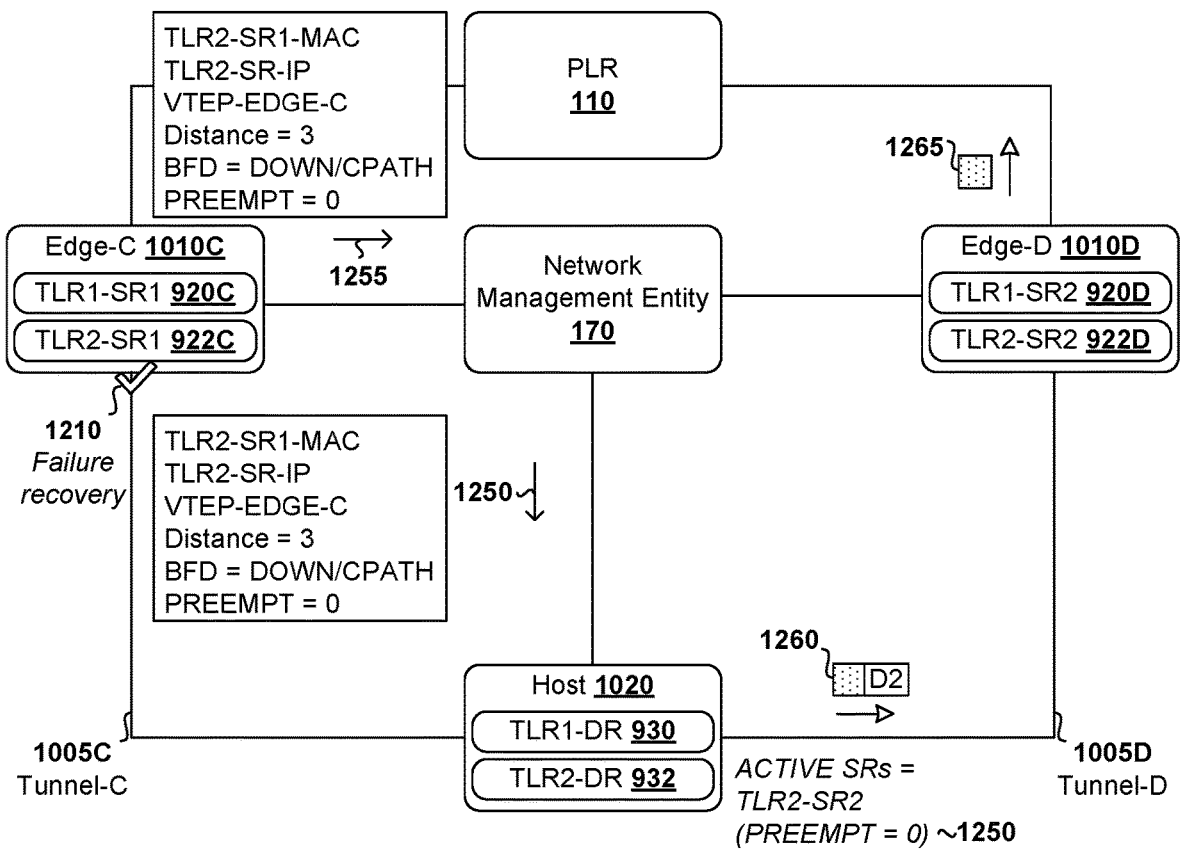
FIG. 12B is a first schematic diagram illustrating a first routing component performing failure recovery handling according to a non-preemptive mode in the example in FIG. 9.

FIG. 12B is a first schematic diagram illustrating first routing component 932 performing failure recovery handling according to a non-preemptive mode in the example in FIG. 9. Similarly, TLR2-DR 932 detects the recovery of failed TLR2-SR1 922C (see 1210 in FIG. 12B), such as by detecting DOWN=0 using a BFD session over tunnel-C 1005C. Based on PREEMPT flag=0 in the path information in FIG. 10B, TLR2-DR 932 decides not to switch back to TLR2-SR1 922C (see 1220 in FIG. 12A) as the active SR.

Instead, once TLR2-SR1 922C has recovered, updated path information (see 1255 in FIG. 12A) is sent to network management entity 170, which then relays it to TLR2-DR 932 (see 1250 in FIG. 12A). The updated path information includes increased distance(TLR2-SR1)=3>distance(TLR2-SR2)=2. After the recovery, TLR2-DR 932 continues to encapsulate and send egress packet (see 1260 in FIG. 12A) destined for external network 105 to TLR2-SR2 922D. The encapsulated egress packet is decapsulated and sent by TLR2-SR2 922D (see 1265 in FIG. 12A) to external network 105 via PLR 110.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 12B. For example, the computer system may implement processes performed by one of the following: network management entity 170, edge node 210A/210B/1010C/1010D, host 220/230/1020, etc.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a first routing component to handle failure at and non-preemptive recovery of a logical router in a first network, wherein the logical router includes the first routing component, an active second routing component, and a standby second routing component, the method comprising:

prior to a failure at the active second routing component, learning first path information associated with a first path provided by the active second routing component, and second path information associated with a second path provided by the standby second routing component, wherein the first path and second path connect the first routing component to a second network;

in response to detecting a first egress packet that is destined for the second network, sending the first egress packet to the active second routing component over the first path based on the first path information;

in response to detecting the failure at the active second routing component:
  assigning the standby second routing component to be a new active second routing component; and
  in response to detecting a second egress packet that is destined for the second network, sending the second egress packet to the new active second routing component over the second path based on the second path information;
detecting recovery of the active second routing component, being a recovered second routing component, from the failure;
updating path information associated with the recovered second routing component to assign a new distance value to the recovered second routing component, wherein the new distance value is a greater distance value than a distance value associated with the new active second routing component; and
assigning the recovered second routing component, having the new distance value, as a new standby second routing component according to a non-preemptive mode.

2. The method of claim 1, further comprising:
based on at least the first path information and second path information, selecting the active second routing component and the standby second routing component from multiple second routing components.

3. The method of claim 2, wherein selecting the active second routing component and the standby second routing component comprises:
comparing multiple distance values associated with the respective multiple second routing components; and
based on the comparison, selecting the active second routing component based on a lowest distance value among the distance values, and the standby second routing component based on a higher distance value compared to the lowest distance value.

4. The method of claim 1, wherein detecting the failure associated with the active second routing component comprises:
detecting that the first path is down or the active second routing component has lost physical connectivity with the second network, or both.

5. The method of claim 4, further comprising:
prior to sending the first egress packet, encapsulating the first egress packet with header information that includes the first MAC address, the IP address, and the first VTEP information; and
prior to sending the second egress packet, encapsulating the second egress packet with header information that includes the second MAC address, the IP address, and the second VTEP information.

6. The method of claim 1, wherein learning the first path information and the second path information comprises:
receiving, from a network manager, the first path information that includes a first Media Access control (MAC) address, an Internet Protocol (IP) address, and first virtual tunnel endpoint (VTEP) information associated with the active second routing component; and
receiving, from the network manager, the second path information that includes a second MAC address, the IP address, and second VTEP information associated with the standby second routing component.

7. A non-transitory computer-readable storage medium that includes a set of instructions which, in response to execution by a processor of a computer system, cause the processor to implement a first routing component to handle failure at and non-preemptive recovery of a logical router in a first network, wherein the logical router includes the first routing component, an active second routing component, and a standby second routing component, and wherein the method comprises:
prior to a failure at the active second routing component, learning first path information associated with a first path provided by the active second routing component, and second path information associated with a second path provided by the standby second routing component, wherein the first path and second path connect the first routing component to a second network;
in response to detecting a first egress packet that is destined for the second network, sending the first egress packet to the active second routing component over the first path based on the first path information;
in response to detecting the failure at the active second routing component:
  assigning the standby second routing component to be a new active second routing component; and
  in response to detecting a second egress packet that is destined for the second network, sending the second egress packet to the new active second routing component over the second path based on the second path information;
detecting recovery of the active second routing component, being a recovered second routing component, from the failure;
updating path information associated with the recovered second routing component to assign a new distance value to the recovered second routing component, wherein the new distance value is a greater distance value than a distance value associated with the new active second routing component; and
assigning the recovered second routing component, having the new distance value, as a new standby second routing component according to a non-preemptive mode.

8. The non-transitory computer-readable storage medium of claim 7, wherein the method further comprises:
based on at least the first path information and second path information, selecting the active second routing component and the standby second routing component from multiple second routing components.

9. The non-transitory computer-readable storage medium of claim 8, wherein selecting the active second routing component and the standby second routing component comprises:
comparing multiple distance values associated with the respective multiple second routing components; and
based on the comparison, selecting the active second routing component based on a lowest distance value among the distance values, and the standby second routing component based on a higher distance value compared to the lowest distance value.

10. The non-transitory computer-readable storage medium of claim 7, wherein detecting the failure associated with the active second routing component comprises:
detecting that the first path is down or the active second routing component has lost physical connectivity with the second network, or both.

11. The non-transitory computer-readable storage medium of claim 7, wherein learning the first path information and the second path information comprises:
receiving, from a network manager, the first path information that includes a first Media Access control (MAC) address, an Internet Protocol (IP) address, and first virtual tunnel endpoint (VTEP) information associated with the active second routing component; and receiving, from the network manager, the second path information that includes a second MAC address, the IP address, and second VTEP information associated with the standby second routing component.

12. The non-transitory computer-readable storage medium of claim 11, wherein the method further comprises:

prior to sending the first egress packet, encapsulating the first egress packet with header information that includes the first MAC address, the IP address, and the first VTEP information; and prior to sending the second egress packet, encapsulating the second egress packet with header information that includes the second MAC address, the IP address, and the second VTEP information.

13. A computer system configured to implement a first routing component to handle failure at and non-preemptive recovery of a logical router in a first network, wherein the logical router includes the first routing component, an active second routing component, and a standby second routing component, the computer system comprising:

a processor; and a non-transitory computer-readable medium having stored thereon instructions that, in response to execution by the processor, cause the processor to:

prior to a failure at the active second routing component, learn first path information associated with a first path provided by the active second routing component, and second path information associated with a second path provided by the standby second routing component, wherein the first path and second path connect the first routing component to a second network;

in response to detecting a first egress packet destined for the second network, send the first egress packet to the active second routing component over the first path based on the first path information;

in response to detecting the failure at the active second routing component:

assign the standby second routing component to be a new active second routing component; and in response to detecting a second egress packet destined for the second network, send the second egress packet to the new active second routing component over the second path based on the second path information;

detect recovery of the active second routing component, being a recovered second routing component, from the failure;

update path information associated with the recovered second routing component to assign a new distance value to the recovered second routing component, wherein the new distance value is a greater distance value than a distance value associated with the new active second routing component; and assign the recovered second routing component, having the new distance value, as a new standby second routing component according to a non-preemptive mode.

14. The computer system of claim 13, wherein the instructions further cause the processor to:

based on at least the first path information and second path information, select the active second routing component and the standby second routing component from multiple second routing components.

15. The computer system of claim 14, wherein instructions that cause the processor to select the active second routing component and the standby second routing component cause the processor to:

compare multiple distance values associated with the respective multiple second routing components; and based on the comparison, select the active second routing component based on a lowest distance value among the distance values, and the standby second routing component based on a higher distance value compared to the lowest distance value.

16. The computer system of claim 13, wherein instructions that cause the processor to detect the failure associated with the active second routing component cause the processor to:

detect that the first path is down or the active second routing component has lost physical connectivity with the second network, or both.

17. The computer system of claim 13, wherein instructions that cause the processor to learn the first path information and the second path information cause the processor to:

receive, from a network manager, the first path information that includes a first Media Access control (MAC) address, an Internet Protocol (IP) address, and first virtual tunnel endpoint (VTEP) information associated with the active second routing component; and receive, from the network manager, the second path information that includes a second MAC address, the IP address, and second VTEP information associated with the standby second routing component.

18. The computer system of claim 17, wherein the instructions further cause the processor to:

prior to sending the first egress packet, encapsulate the first egress packet with header information that includes the first MAC address, the IP address, and the first VTEP information; and prior to sending the second egress packet, encapsulate the second egress packet with header information that includes the second MAC address, the IP address, and the second VTEP information.

* * * * *